(12) United States Patent
Saotome et al.

(10) Patent No.: US 6,510,374 B1
(45) Date of Patent: Jan. 21, 2003

(54) ROAD SURFACE GRADIENT DETECTING APPARATUS

(75) Inventors: Hiroshi Saotome, Tochigi-ken (JP); Shuichi Fujimoto, Tochigi ken (JP); Tetsushi Miyazaki, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/850,077

(22) Filed: May 8, 2001

(30) Foreign Application Priority Data

May 26, 2000 (JP) ........................... 2000-156946

(51) Int. Cl.$^7$ ..................... G06F 17/00; B60K 31/04; F16H 61/14
(52) U.S. Cl. .................. 701/80; 701/87; 701/54; 477/107
(58) Field of Search .................. 701/80, 87, 84, 701/51, 54, 94, 68, 53, 58, 65, 69, 36; 477/107, 115, 169, 174

(56) References Cited

U.S. PATENT DOCUMENTS

| | | | | |
|---|---|---|---|---|
| 5,631,829 A | * | 5/1997 | Takasaki et al. | 364/424.098 |
| 5,752,214 A | * | 5/1998 | Minowa et al. | 701/111 |
| 5,832,400 A | * | 11/1998 | Takahashi et al. | 701/53 |
| 5,947,865 A | * | 9/1999 | Watanabe et al. | 477/169 |
| 6,169,949 B1 | * | 1/2001 | Sato | 701/51 |
| 6,216,081 B1 | * | 4/2001 | Tabata et al. | 701/87 |

FOREIGN PATENT DOCUMENTS

| | | |
|---|---|---|
| JP | 62-216842 | 9/1987 |
| JP | 1-244930 | 9/1989 |
| JP | 9-207735 | 8/1997 |
| JP | 9-210093 | 8/1997 |

* cited by examiner

Primary Examiner—Tan Q. Nguyen
Assistant Examiner—Dalena Tran
(74) Attorney, Agent, or Firm—Arent Fox Kintner Plotkin & Kahn (57) ABSTRACT

When a road surface gradient is calculated by a wheel driving force and a vehicle acceleration, if the wheel driving force is calculated based on an output torque of an engine, the accuracy of calculating the wheel driving force, i.e., the road surface gradient becomes poor due to deterioration by aging of the engine or the like. In order to solve this kind of disadvantage, a fluid transmission torque of a torque converter is calculated by those torque ratio of the torque converter and an input shaft torque coefficient which correspond to a speed ratio of the torque converter, and an input rotational speed of the torque converter (=engine rotational speed (step S21-3). The road surface gradient is calculated by using a wheel driving force to be calculated by this torque.

2 Claims, 9 Drawing Sheets

ROAD SURFACE GRADIENT DETECTING APPARATUS

BACKGROUND OF THE INVENTION

1. Field of the Invention

The present invention relates to a road surface gradient detecting apparatus for use in a vehicle such as a motor vehicle in which wheels are driven by an engine through a power transmission device having interposed therein a torque converter and relates, in particular, to a road surface gradient detecting apparatus which is suitable in performing a control of a starting frictional engaging element which is interposed in series with the torque converter inside the power transmission device, the control being performed depending on the road surface gradient at the time when the vehicle is at a standstill.

2. Description of Related Art

Conventionally, as a control apparatus for a starting frictional engaging element, the following is known. Namely, even in a particular driving state in which an engine is idling and the vehicle speed is below a predetermined value, the starting frictional engaging element is arranged to be capable of being engaged so that the vehicle can move in the form of a so-called creep running. In addition, in order to avoid the occurrence of vibrations of a vehicle body and poor fuel economy due to a creeping torque at the time of depressing a brake pedal, the engaging force of the starting frictional engaging element at the time of a vehicle standstill with the brake pedal being depressed is made smaller than the one when the brake pedal is not being depressed (see, for example, Published Unexamined Japanese Patent Application No. 216842/1987 and Published Unexamined Japanese Patent Application No. 244930/1989).

In the above-described arrangement, when the brake pedal is released, the engaging force of the starting frictional engaging element is increased, and the creeping torque returns to an original magnitude. The engaging force of the starting frictional engaging element, however, does not increase instantaneously, with the result that a slight time lag occurs for the creeping torque to return to the original magnitude.

When the vehicle starts on an upward slope (or on an upgrade), if the time lag occurs, as described above, to the returning of the creeping torque after releasing the depression of the brake pedal, it becomes necessary for the driver to quickly depress the accelerator pedal right after releasing the depression of the brake pedal to obtain a torque which counters a backward-moving torque of the vehicle due to gravity.

In order to improve the starting operability (or the ease with which the vehicle can start) on an upgrade, there is known an arrangement in which a means for detecting a road surface gradient is provided. When the upgrade has a road surface gradient exceeding a predetermined value, the decrease in the engaging force of the starting frictional engaging element is prohibited when the brake is in operation (see Published Unexamined Japanese Patent Application No. 210093/1997).

In addition, there is also known an arrangement in which a road surface gradient is calculated from a wheel driving force and a vehicle acceleration, although it is a road surface gradient detecting apparatus for speed change control in an automatic transmission (see Published Unexamined Japanese Patent Application No. 207735/1997).

As a road surface gradient detecting means for controlling a starting frictional engaging element, it is considered to use the above-described road surface gradient detecting apparatus, instead of a special sensor. This detecting apparatus, however, is arranged to calculate the wheel driving force based on an engine output torque and has therefore the following disadvantages. Namely, the actual engine output torque varies with aging of the engine, the environment in which the engine is used, the kind of fuel to be used, or the like. Therefore, the wheel driving force cannot be calculated accurately, resulting in an error in detecting the road surface gradient.

Further, in the region of low rotational speed of the engine, the variation in the engine output torque becomes large. Therefore, if the wheel driving force is calculated based on the engine output torque in the region of low rotational speed of the engine such as at the time of deceleration (or speed reduction) which leads to a standstill (or stopping) of the vehicle, the error becomes larger. As a result, there is a possibility that the control of the starting frictional engaging element depending on the road surface gradient at the time of vehicle standstill cannot be performed appropriately.

In case a torque converter is interposed in the power transmission device, the fluid transmission torque TQ of the torque converter is expressed as $$TQ = K \times \kappa \times \xi \times N^2$$

where $\kappa$ is a torque ratio of the torque converter, $\tau$ is an input shaft torque coefficient, N is an input rotational speed of the torque converter, and K is a coefficient peculiar to the torque converter. Based on this toque TQ, the wheel driving force can be calculated. In case of a torque converter containing therein a lock-up clutch, if the input side and the output side of the toque converter are directly coupled together by the operation of the lock-up clutch, the output torque of the converter becomes equal to the engine output torque which corresponds to the input torque of the torque converter. However, at the time of speed reduction leading to the vehicle standstill, the lock-up clutch becomes inoperative and, thus, the output torque of the torque converter can be calculated by the above-described formula.

In view of this point, the present invention has an object of providing a road surface gradient detecting apparatus which is capable of accurately computing the road surface gradient.

SUMMARY OF THE INVENTION

In order to attain the above and other objects, the present invention is a road surface gradient detecting apparatus for use in a vehicle in which wheels are driven by an engine through a power transmission device having interposed therein a torque converter containing therein a lock-up clutch, the road surface gradient being calculated by a wheel driving force and a vehicle acceleration, the apparatus comprising: a first driving force calculating means for calculating, while the lock-up clutch is not in operation, the wheel driving force based on that fluid transmission torque of the torque converter which is obtained by a speed ratio of the torque converter and an input rotational speed of the torque converter; a second driving force calculating means for calculating, while the lock-up clutch is in operation in a direct-coupled state, the wheel driving force based on an engine output torque; and a third driving force calculating means for calculating, while the lock-up clutch is in operation in a slipping state, the wheel driving force based on a total torque of that fluid transmission torque of the torque converter which is obtained by the speed ratio of the torque converter and the input rotational speed of the torque converter and that transmission torque of the lock-up clutch which is calculated by an engaging force of the lock-up clutch, whereby the road surface gradient is calculated by the wheel driving force which is calculated by the driving force calculating means corresponding to the state of the lock-up clutch.

According to the present invention, when the lock-up clutch has becomes inoperative, the wheel driving force is calculated by the first driving force calculating means based on that fluid transmission torque of the torque converter which is calculated by the torque ratio of the torque converter, the input shaft torque coefficient, and the input rotational speed of the torque converter, according to the above-described formula, the toque ratio of the torque converter being searched with the speed ratio of the torque converter serving as a parameter. By using this wheel driving force, the road surface gradient is calculated. Here, the fluid transmission torque to be calculated by the above-described formula is hardly subject to the effect of deterioration with aging, or the like. Therefore, the wheel driving force can be accurately calculated whereby an accuracy of calculating the road surface gradient can be secured.

When the lock-up clutch is in operation in a direct-coupled state, the wheel driving force is calculated by the second driving force calculating means based on the engine output torque. On the other hand, when the lock-up clutch is in operation in a slipping state, the wheel driving force is calculated by the third driving force calculating means based on the total torque of the fluid transmission torque of the torque converter and the transmission torque of the lock-up clutch. At the time of speed reduction of the vehicle leading to the vehicle standstill, since the operation of the lock-up clutch is switched from the direct-coupled state to the slipping state or the inoperative state, the wheel driving force is calculated by the third driving force calculating means or the first driving force calculating means. Therefore, even if the engine output torque largely varies in the region of low rotational speed of the engine, the wheel driving force can be calculated without using the engine output torque. Based on this wheel driving force, the road surface gradient can be accurately calculated. In this manner, the starting frictional engaging element can be accurately controlled depending on the road surface gradient at the time of the vehicle standstill.

In case of a torque converter which does not contain therein a lock-up clutch, only the first driving force calculating means is provided. The road surface gradient is then calculated by using the wheel driving force to be calculated based on that fluid transmission torque of the torque converter which is obtained by the speed ratio of the torque converter and the input rotational speed of the torque converter.

BRIEF DESCRIPTION OF THE DRAWINGS

The above and other objects and the attendant advantages of the present invention will become readily apparent by reference to the following detailed description when considered in conjunction-with the accompanying drawings wherein.

DETAILED DESCRIPTION OF A PREFERRED EMBODIMENT

Figure 1:
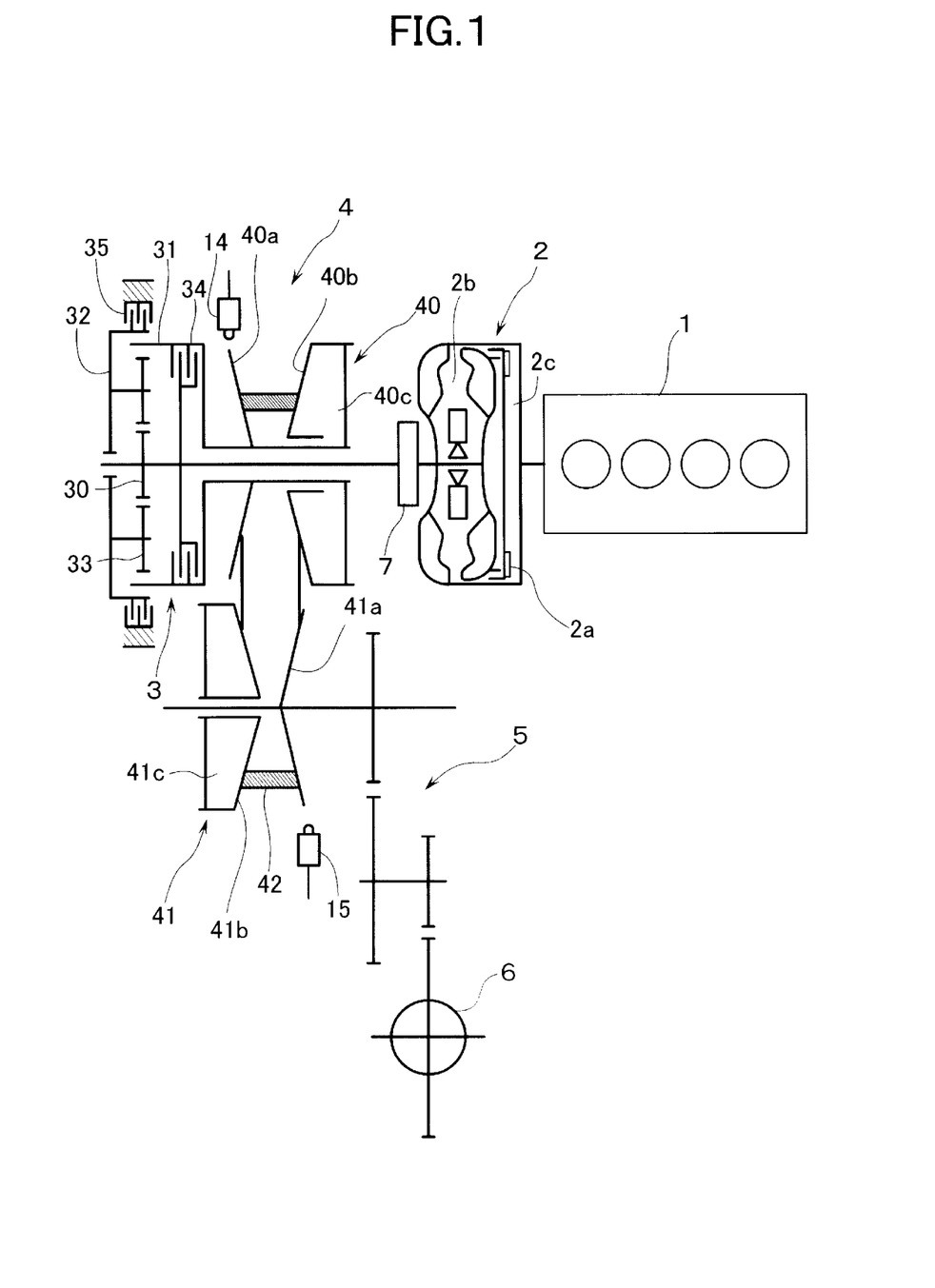
FIG. 1 is a skeleton diagram of one example of a power transmission device of a motor vehicle on which an apparatus of the present invention is mounted.

FIG. 1 is a power transmission device which transmits an output torque of an engine 1 (also called an engine output torque) to driving wheels of a vehicle such as a motor vehicle. This power transmission device is made up of: a torque converter 2 which is directly coupled to the engine 1 and which contains therein a lock-up clutch 2a; a mechanism 3 for switching between a forward running and a reverse running (also called a forward/reverse switching mechanism 3) which is disposed on an output side of the torque converter 2; a belt type of stepless speed changing mechanism (or continuously variable transmission) 4 which is disposed on an output side of the forward/reverse switching mechanism 3; a reduction gear train 5 which is disposed on the output side of the stepless speed changing mechanism 4; and a differential gear 6 which distributes the power from the reduction gear train 5 to left and right driving wheels.

The stepless speed changing mechanism 4 is made up of: a drive pulley 40 which is coupled to the torque converter 2 through the forward/reverse switching mechanism 3; a driven pulley 41 which is coupled to the differential gear 6 through the reduction gear train 5; and a metallic V-belt 42 which is wound between both the pulleys 40, 41. Each of the pulleys 40, 41 is made up of: a stationary flange 40a, 41a; a movable flange 40b, 41b which is movable in an axial direction relative to the stationary flange 40a, 41a; and a cylinder chamber 40c, 41c which urges the movable flange 40b, 41b to move relative to the stationary flange 40a, 41a. By appropriately controlling the pressure of oil to be supplied to the cylinder chamber 40c, 41c of the respective pulleys 40, 41, there can be generated an appropriate pulley side pressure which does not give rise to slipping of the belt 42 and, also, the pulley widths of both the pulleys 40, 41 are varied. The diameter of winding, or the diameter of contact, of the belt 42 is thus changed to perform stepless speed changing.

The forward/reverse switching mechanism 3 is constituted into a planetary type of gear mechanism which is made up of: a sun gear 30 which is coupled to the torque converter 2; a ring gear 31 which is coupled to the drive pulley 40; a carrier 32; planetary gears 33 which are rotatably supported by the carrier 32 and which are in gearing mesh with the sun gear 30 and the ring gear 32; a forward running clutch 34 which is capable of coupling the sun gear 30 and the ring gear 31 together; and a reverse running brake 35 which is capable of fixing the carrier 32. In this arrangement, when the forward running clutch 34 is engaged, the ring gear 31 rotates together with the sun gear 30, whereby the drive pulley 40 is driven in the normal direction of rotation (forward running direction). When the reverse running brake 35 is engaged, the ring gear 31 rotates in a direction opposite to that of the sun gear 30, whereby the drive pulley 40 is driven in the reverse running direction. When both the forward running clutch 34 and the reverse running brake 35 are released, the power transmission through the forward/reverse switching mechanism 3 is shut off, whereby the power transmission device becomes a neutral state.

Figure 2:
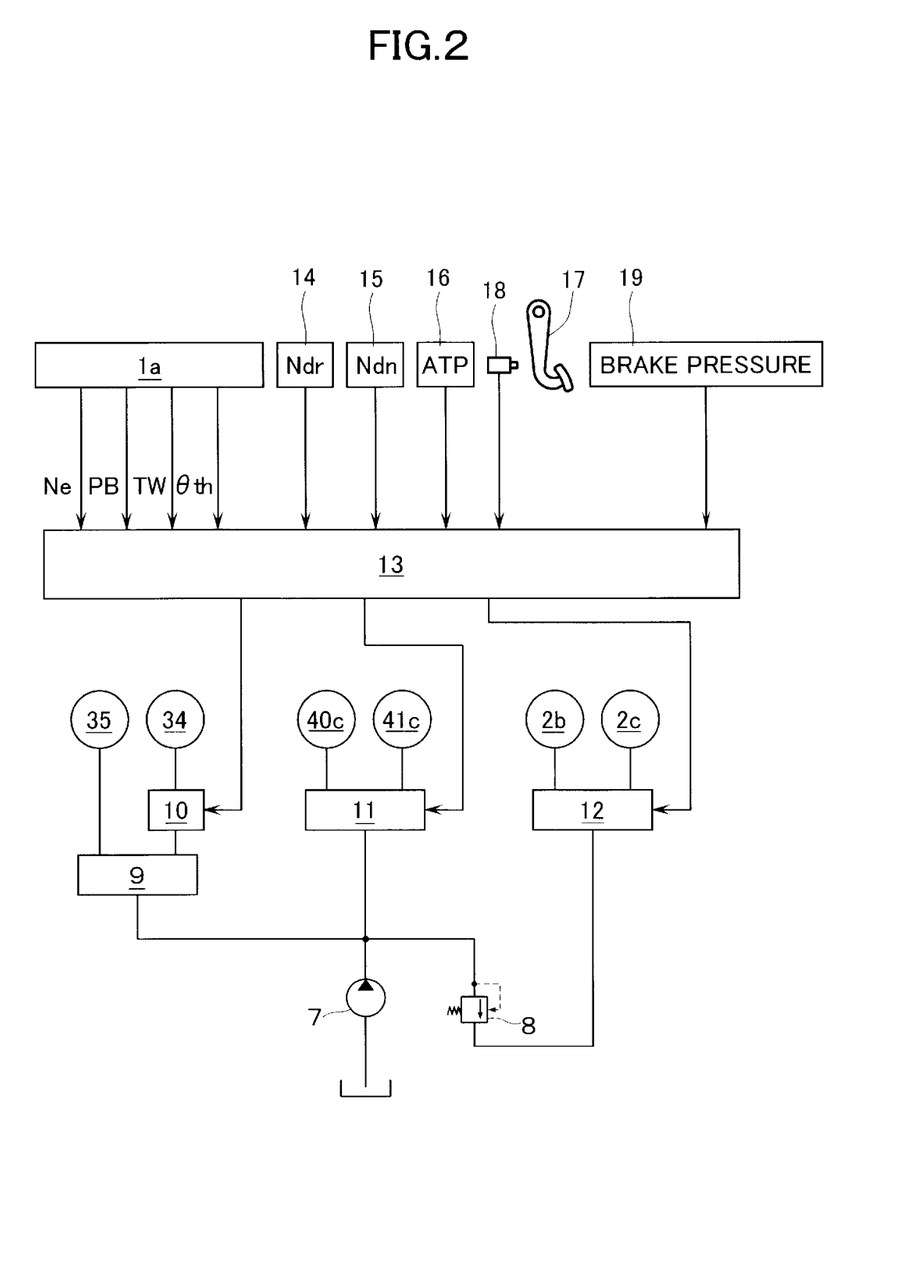
FIG. 2 is a block diagram showing a hydraulic circuit of the power transmission device.

In the power transmission device, there is provided a hydraulic oil circuit having an oil pump 7, as a hydraulic pressure source, which is driven by the engine 1 through the torque converter 2. This hydraulic oil circuit is provided, as shown in FIG. 2, with: a regulator 8 which adjusts the hydraulic pressure from the oil pump 7 to a predetermined line pressure; a manual valve 9 which is switched in a manner interlocked with a shift lever (not illustrated) and which controls the oil supply to, and discharge thereof from, the forward running clutch 34 and the reverse running brake 35; a clutch control section 10 for controlling the hydraulic pressure of the forward running clutch 34 which serves as a starting frictional engaging element; a speed change control section 11 which performs the continuously variable speed changing by controlling the hydraulic pressure in the cylinder chambers $40c$, $41c$ of the drive pulley 40 and the driven pulley 41; and a lock-up control section 12 which controls the hydraulic pressure in an inner space $2b$ in the torque converter 2 and in a back pressure chamber $2c$ partitioned from the inner space $2b$ by the lock-up clutch $2a$ with a leak oil from the regulator 8 serving as a working oil, whereby the lock-up clutch $2a$ is operated in the direct-coupled state, is operated in a slipping state, or is caused not to operate.

The clutch control section 10, the speed control section 11 and the lock-up control section 12 have each built therein a solenoid valve which is controlled by a controller 13. The controller 13 receives, as inputs from an engine control unit $1a$, signals to show a rotational speed Ne of the engine 1, a suction negative pressure PB, a water temperature TW of engine cooling water, and a throttle opening degree θth. The controller 13 further receives as inputs the following signals: i.e., a signal from a first rotation sensor 14 which detects a rotational speed Ndr of the drive pulley 40; a signal from a second rotation sensor 15 which detects a rotational speed Ndn of the driven pulley 41; a signal from a shift range detector 16 which detects a shift range position ATP based on the positions of the shift lever or the manual valve 9; a signal from a brake operation detector 18 which detects the depression of a brake pedal 17; and a signal from a brake pressure sensor 19 which detects the hydraulic pressure in the brake.

An explanation will now be made about the control of the forward running clutch 34 by the controller 13 through the clutch control section 10. The control mode of the forward running clutch 34 is divided into a creeping mode and a direct coupling mode. The creeping mode is selected when the engine 1 is in the idling state and the vehicle speed is zero or considerably low (e.g., 3 km/h). In states other than the above state, the direct coupling mode is selected, and the hydraulic pressure in the forward running clutch 34 is increased (or boosted) to the line pressure.

Figure 3:
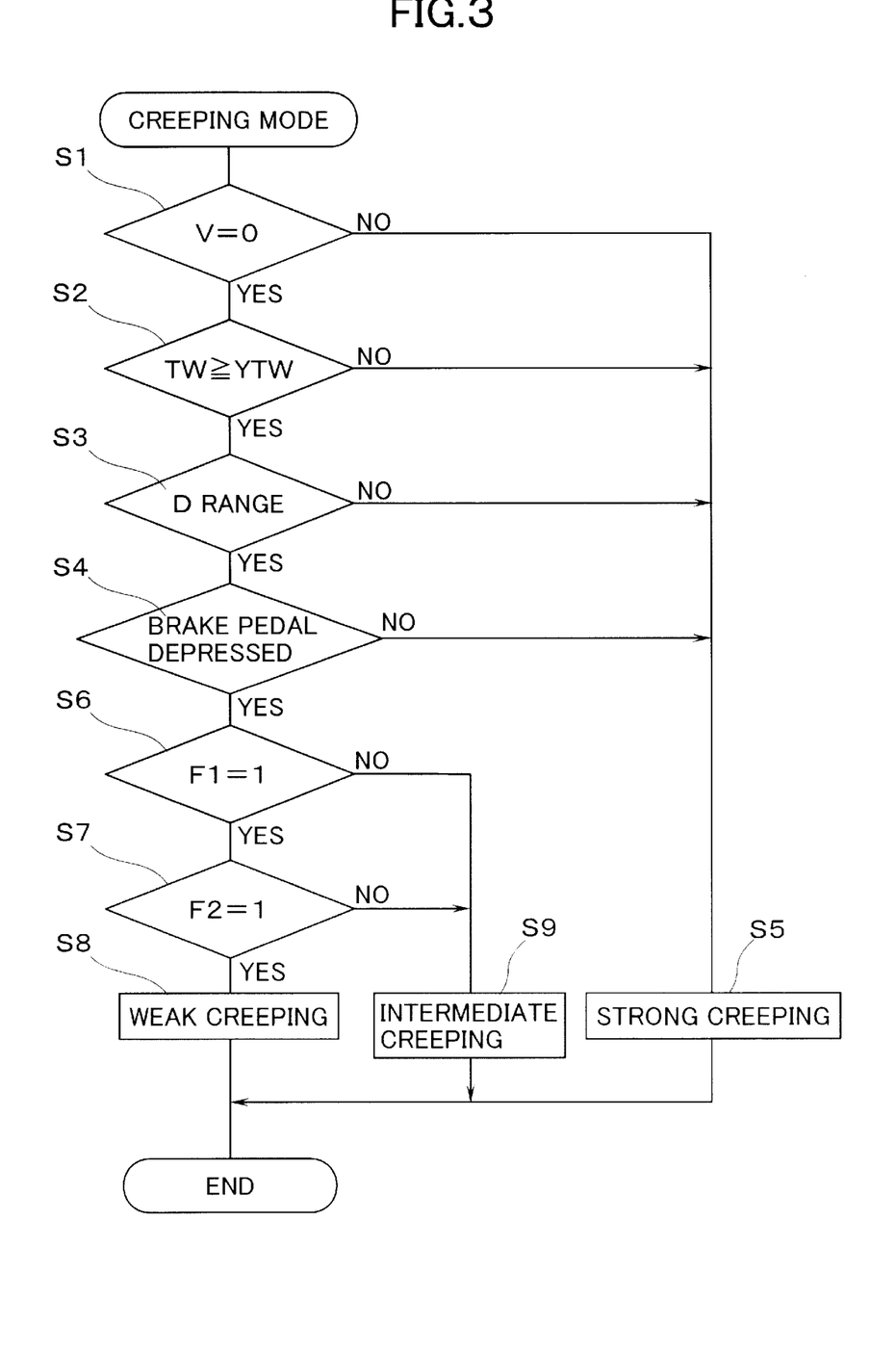
FIG. 3 is a flow chart showing a control program, in a creeping mode, of a forward running clutch which is provided in the power transmission device.

When the creeping mode is selected, at step S1, a discrimination (or determination) is made, as shown in FIG. 3, as to whether the second rotation sensor 15 has detected the rotation of the driven pulley 41, in other words, as to whether the vehicle speed V is zero or not. If V=0, a discrimination is made at step S2 as to whether the cooling water temperature TW is above a predetermined temperature YTW or not. If TW≧YTW, the program proceeds to step S3, where a discrimination is made based on the signal from the shift range detector 16 as to whether the shift range is in the D range which is the automatic speed change range for forward running. If the shift range is in the D range, a discrimination is made at step S4 as to whether the brake pedal 17 is being depressed or not based on the signal from the brake operation detector 18.

If any one of the following conditions, i.e., a condition that V=0, a condition of TW≧YTW, a condition that the range is in the D range, and a condition that the brake pedal is being depressed, has not been satisfied, the program proceeds to step S5, where the hydraulic pressure of the forward running clutch 34 (a clutch pressure) is set to a value (a strong creeping pressure) which is capable of obtaining a creeping torque sufficient to cause the vehicle to creep. If all of the above four conditions have been satisfied, the program proceeds to step S6, where a discrimination is made as to whether a first flag F1, an explanation of which is made hereinbelow, has been set to "1" or not. If F1=1, a discrimination is made at step S7 as to whether a second flag F2, an explanation of which is made hereinbelow, has been set to "1" n or not. If F2=1, the program proceeds to step S8, where the clutch pressure is set to such a value (a weak creeping pressure) that an ineffective stroke of a piston of the forward running clutch 34 (i.e., a play until the clutch plates begin to be engaged) is removed and, therefore, that a slight torque transmission is performed. If F1=0 or F2=0, the program proceeds to step S9, where the clutch pressure is set to a value (an intermediate creeping pressure) which is smaller than the strong creeping pressure but which is larger than the weak creeping pressure.

Figure 4:
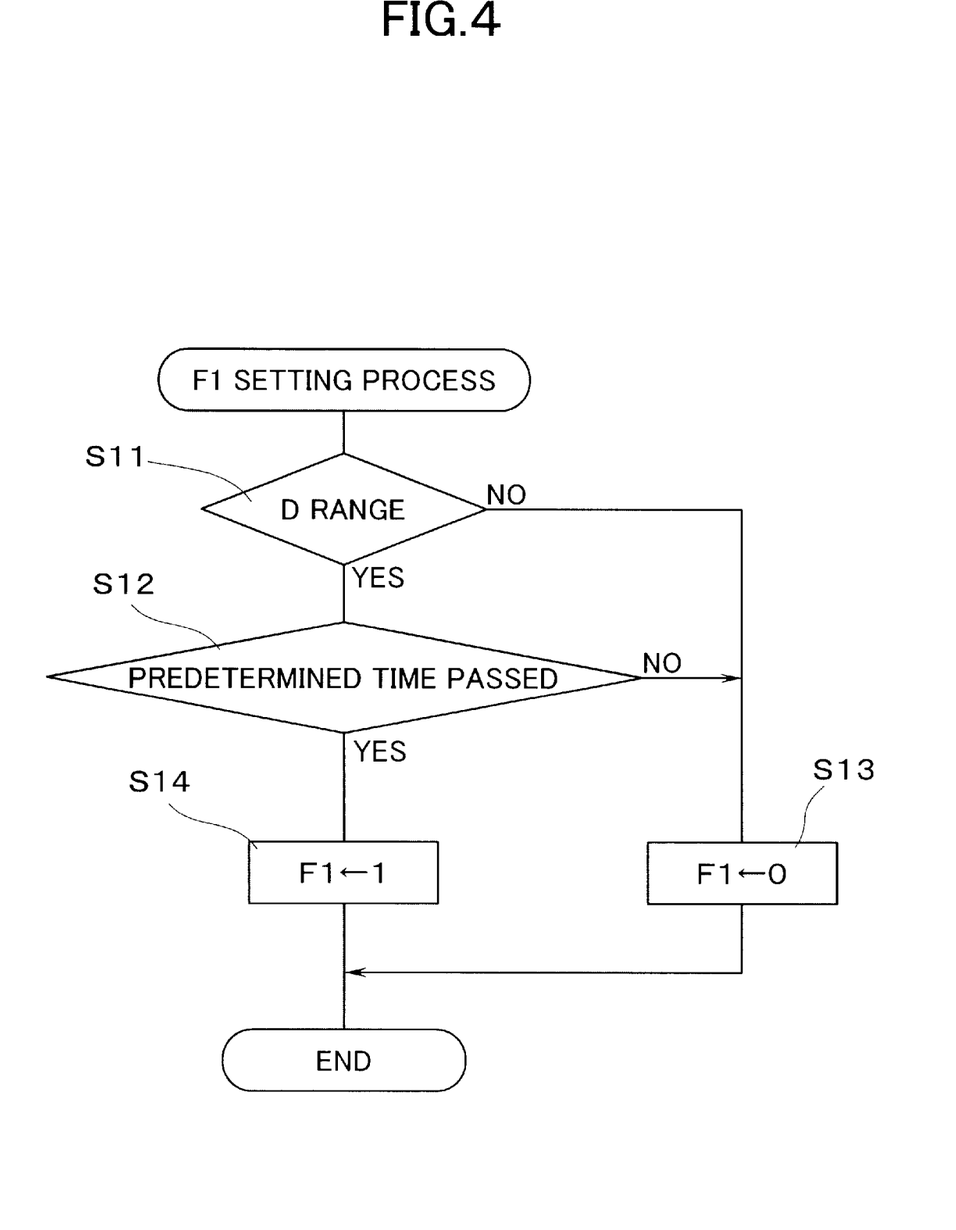
FIG. 4 is a flow chart showing a subroutine work for performing the process of setting a first flag F1 which is used in the control in the creeping mode.

The first flag F1 is a flag which is set to "1" after lapse of a predetermined time after switching to the D range. Details of process for setting the first flag F1 are shown in FIG. 4. First, a discrimination is made at step S11 as to whether the shift range is in the D range or not. If the shift range is in the D range, a discrimination is made at step S12 as to whether a predetermined time (e.g., 15 seconds) has passed or not from the point of time of switching to the D range. If the shift range is not in the D range or if the predetermined time has not passed from the point of time of switching to the D range, the first flag F1 is reset to "0" at step S13. When the predetermined time has passed from the time of switching to the D range, the first flag F1 is set to "1" at step S14. In this manner, the state of F1=0 is attained right after switching to the D range, and the program proceeds from step S6 to step S9, where the clutch pressure is set to the intermediate creeping pressure. Therefore, a delay in the rise in the transmission torque of the forward running clutch 34 is improved at the time of starting of the vehicle right after switching to the D range. As a result, the vehicle can be started at a good response.

Figure 5:
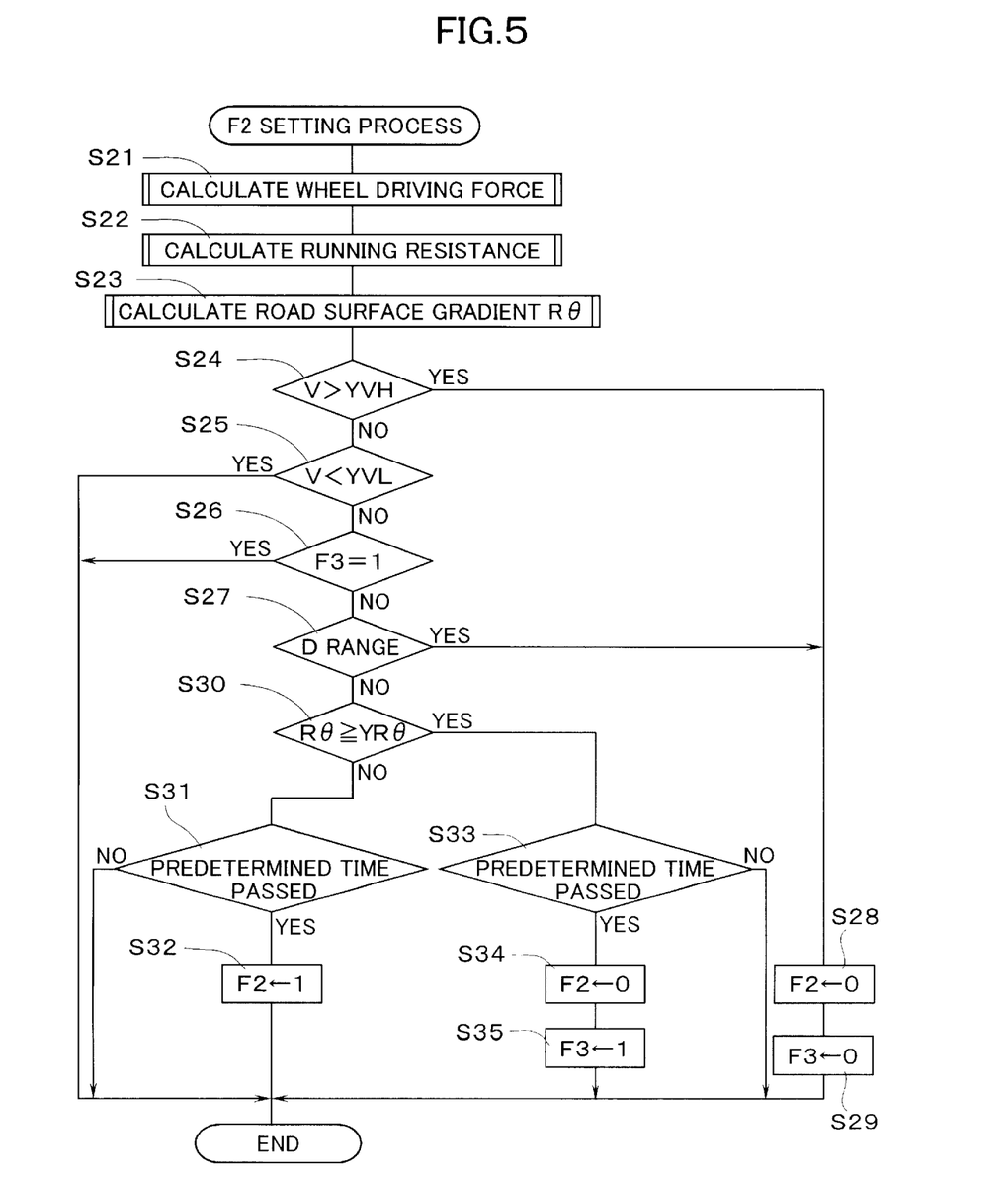
FIG. 5 is a flow chart showing a subroutine work for performing the process of setting a second flag F2 which is used in the control in the creeping mode.

The second flag F2 is a flag which is set to "1" when the road surface gradient Re to be calculated by the vehicle driving force and the vehicle acceleration is below a predetermined upgrade YRθ. Details of process of setting the second flag F2 are shown in FIG. 5. First, the wheel driving force is calculated at step S21, the running resistance of the vehicle is calculated at step S22, and the road surface gradient Rθ is calculated at step S23. Then, at step S24, a discrimination is made as to whether the vehicle speed V has exceeded an upper limit speed YVH (e.g., 35 km/h) in judging the road surface gradient. If V≦YVH, a discrimination is made at step S25 as to whether the vehicle speed v is below a lower limit value YVL (e.g., 10 km/h) in judging the road surface gradient. If YVL≦V≦YVH, a discrimination is made at step S26 as to whether a third flag F3, an explanation of which is made hereinbelow, has been set to "1" or not. If F3=0, a discrimination is made at step S27 as to whether the shift range is in the D range or not. If V>YVH or if the shift range is not in the D range, the second flag F2 is reset at step S28 to "0", and the third flag F3 is reset at step S29 to "0." If V<YVL or if F3=1, one round of precessing is finished without taking any further steps.

If the shift range is in the D range, a discrimination is made at step S30 as to whether the road surface gradient Rθ is above a predetermined upgrade YRθ or not. If Rθ<YRθ, a discrimination is made at step S31 as to whether a predetermined time has passed, i.e., as to whether the state of Rθ<YRθ has been attained continuously for a predetermined period of time. Once the predetermined time has passed, the program proceeds to step S32, where the second flag F2 is set to "1." If Rθ≧YRθ, a discrimination is made at step S33 as to whether the predetermined time has passed or not, i.e., as to whether the state of Rθ≧YRθ has been attained continuously for a predetermined period of time or not. After the lapse of the predetermined time, the program proceeds to step S34, where the second flag F2 is reset to "0" and, at step S35, the third flag F3 is set to "1." In this manner, if a discrimination is made that the state of Rθ≧YRθ has been continuously maintained for a predetermined period of time while the vehicle is running under condition of YVL≦V≦YVH in the D range, the state of F2=0 is established. The program then proceeds from step S7 to step S9, where the clutch pressure is set to the intermediate creeping pressure. In this manner, at the time when the motor vehicle is at a standstill on an upgrade having a slope larger than a predetermined slope YRθ, even if the brake pedal BP is depressed, the clutch pressure will not be decreased to the weak creeping pressure. Therefore, at the time when the depression of the brake pedal BP is released, the creeping torque increases, at a good response, to the torque which can resist the reverse-running torque of the vehicle due to the gravity. As a result, it is not necessary for the driver to depress the accelerator pedal in a hurry after the brake pedal has been released. The operation to start the vehicle on an upgrade becomes easy.

Figure 6:
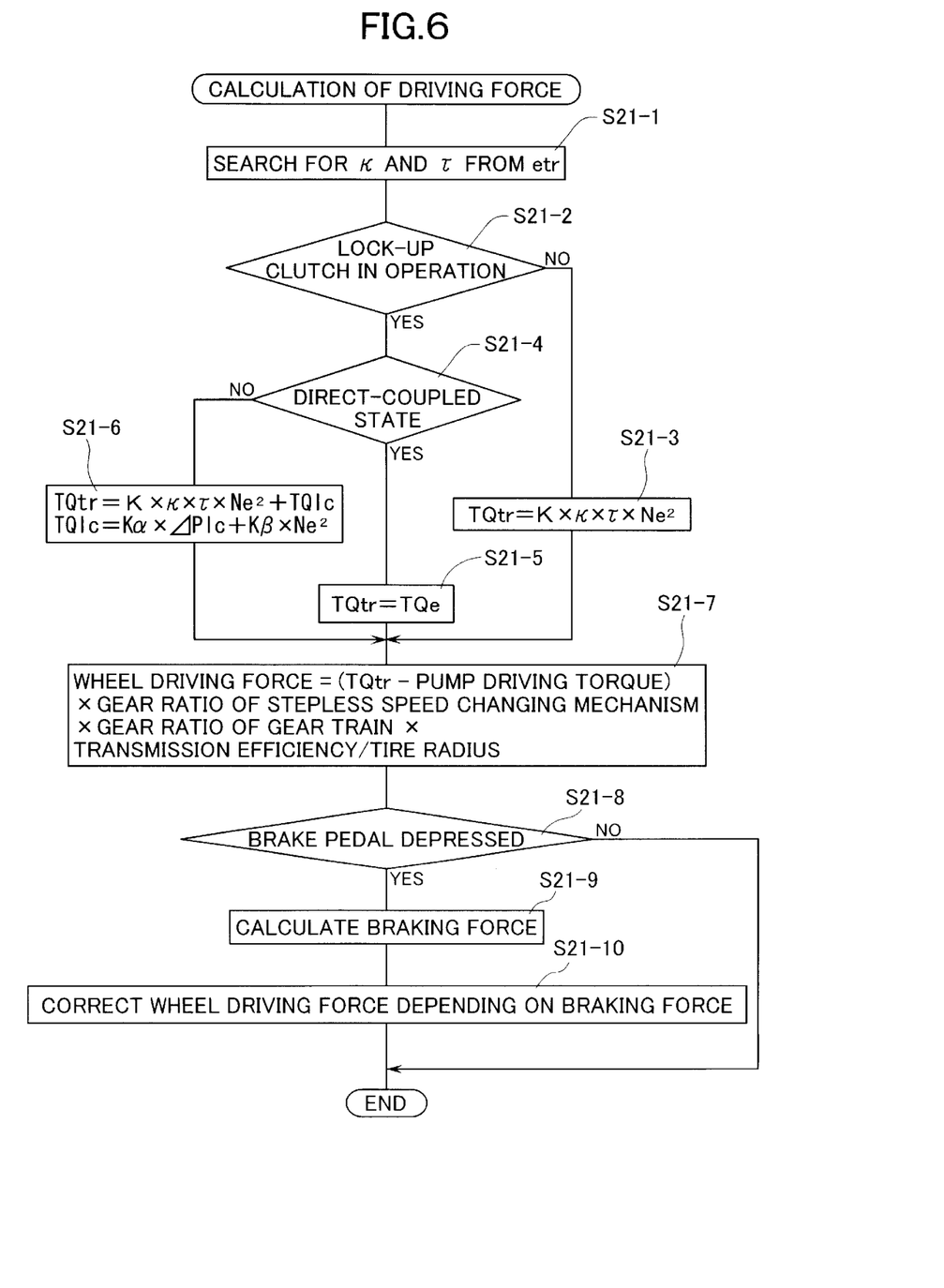
FIG. 6 is a flow chart showing the details of that process of calculating a wheel driving force which is included in the process of setting the second flag F2.
Figure 7:
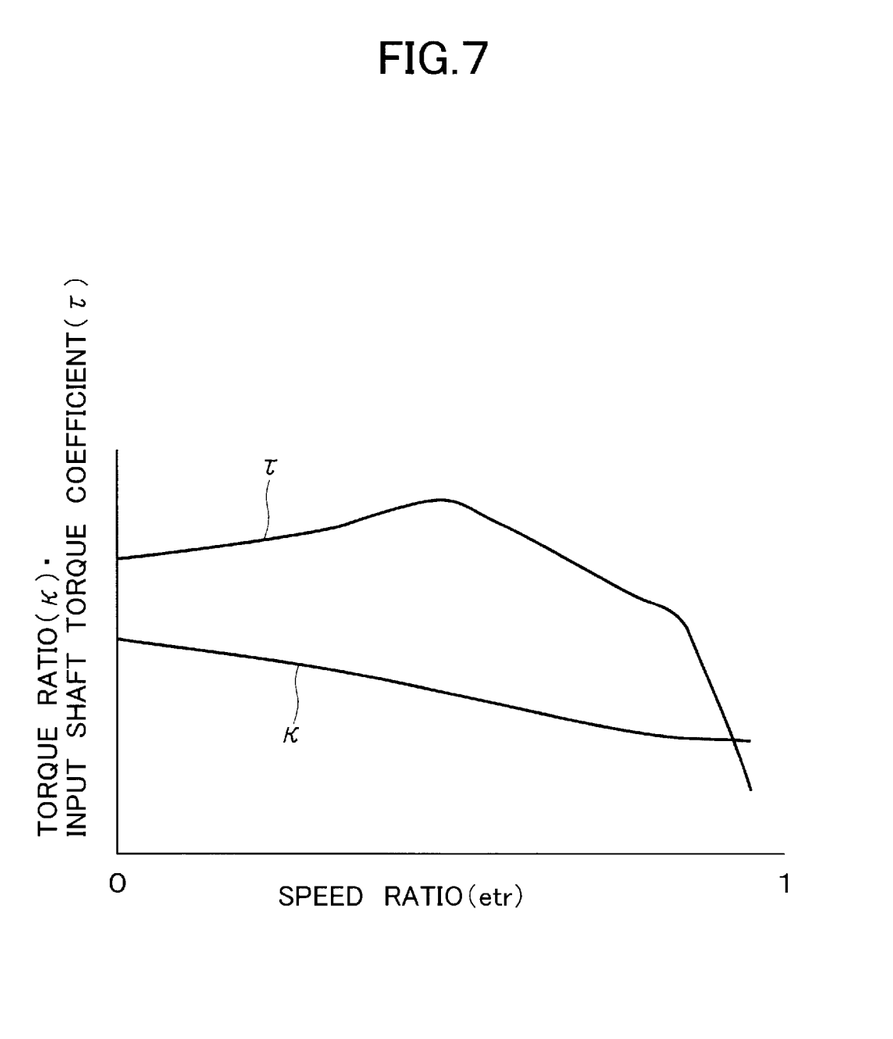
FIG. 7 is that graph showing a data table of a torque ratio and an input torque coefficient which is set with a speed ratio of the torque converter as a parameter.

Details of the process for calculating the wheel driving force which is to be performed at step S21 are shown in FIG. 6. First, at step S21-1, a speed ratio etr (=Ndr/Ne) of the torque converter 2 is calculated from that rotational speed Ne of the engine 1 which is equal to the input rotational speed of the torque converter 2, and that rotational speed Ndr of the drive pulley 40 which is equal to the output rotational speed of the torque converter 2. That torque ratio κ of the torque converter 2 which corresponds to this speed ratio etr and an input shaft torque coefficient τ are searched for in a data table as shown in FIG. 7. Then, a discrimination is made at step S21-2 as to whether the lock-up clutch 2a is in operation or not. If the lock-up clutch 2a is not in operation, an output torque TQtr of the torque converter 2 is calculated at step S21-3 by the following formula $$TQtr=K\times\kappa\times\tau\times Ne^2$$

where K is a coefficient peculiar to the torque converter 2. The above formula represents the fluid transmission torque of the torque converter 2.

If the lock-up clutch 2a is in operation, a discrimination is made at step S21-4 as to whether the lock-up clutch 2a is being operated in a direct-coupled state or not based on the slip ratio of the torque converter 2. If the lock-up clutch 2a is in the direct-coupled state, an output torque TQe of the engine 1 is obtained through searching in the map based on the rotational speed Ne of the engine 1 and the suction negative pressure PB. This output torque TQe is made to be the output torque TQtr of the torque converter 2. If the lock-up clutch 2a is being operated in a slipping state, the output torque TQtr of the torque converter 2 is calculated, at step S21-6, from the following formula $$TQtr=K\times\kappa\times\tau\times Ne^2+TQlc$$

as a total amount of the fluid transmission torque of the torque converter 2 and the transmission torque TQlc of the lock-up clutch 2a. In this formula, TQlc is calculated from the following formula $$TQlc=K\alpha\times\Delta Plc+K\beta\times Ne^2$$

where ΔPlc is that differential pressure command value between the hydraulic pressure in the inner space 2b of the torque converter 2 and the hydraulic pressure in the back pressure chamber 2c which is defined as the engaging force of the lock-up clutch 2a, Kα is a coefficient depending on the area of the friction surface or the friction coefficient of the lock-up clutch 2a, and Kβ is a correction coefficient due to a centrifugal hydraulic pressure.

Once the output torque TQtr of the torque converter 2 has been calculated as described above, the driving torque of the oil pump 7 is deducted from TQtr at step S21-7. This deducted value is multiplied by the gear ratio of the stepless speed changing mechanism, the gear ratio of the gear train 5, and the power transmission efficiency. This multiplied value is divided by the radius of the tire of the driving wheel, whereby the wheel driving force is calculated. Then, at step S21-8, a discrimination is made as to whether the brake pedal 17 is being depressed or not. If the brake pedal 17 is being depressed, the braking force is calculated at step S21-9 based on the hydraulic pressure of the brake and, at step S21-10, the wheel driving force is corrected by deduction depending on the braking force.

Figure 8:
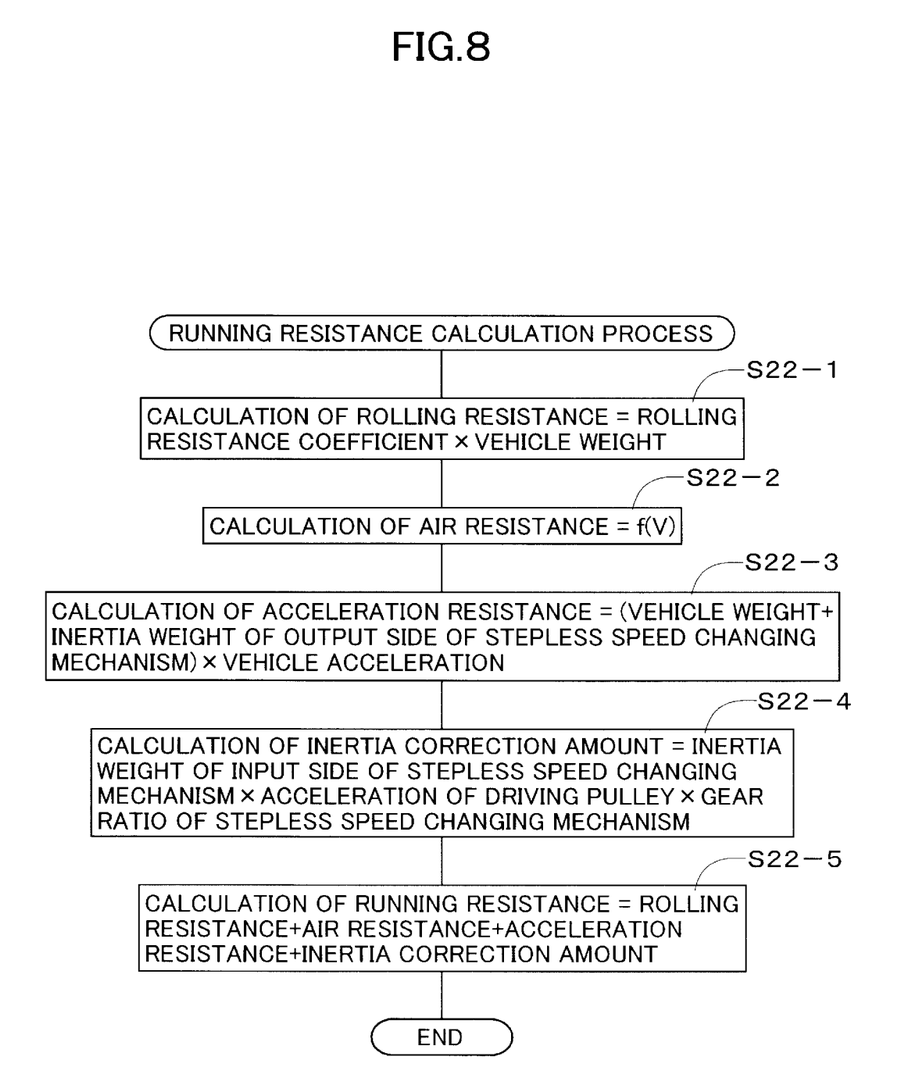
FIG. 8 is a flow chart showing the details of that process of calculating a running resistance which is included in the process of setting the second Flag F2.

Details of that process for calculating the running resistance which is to be performed at step S22 are shown in FIG. 8. First, at step S22-1, a rolling resistance is calculated by multiplying the vehicle weight by a rolling resistance coefficient. Then, at step S22-2, an air resistance is calculated by searching in the table with the vehicle speed V as a parameter. Thereafter, the program proceeds to step S22-3, where the vehicle weight is added by an equivalent inertia weight of a rotating member on the output side of the stepless speed changing mechanism 4 whose rotation changes synchronously with the change in the vehicle speed. This added value is multiplied by the rate of change in the vehicle speed, i.e., the vehicle acceleration, whereby the acceleration resistance is obtained. Then, the program proceeds to step S22-4, where an equivalent inertia weight of a rotating member on the input side of the stepless speed changing mechanism 4 whose rotation changes synchronously with the change in the engine rotational speed Ne is multiplied by the rotational acceleration of the drive pulley 40 and the gear ratio of the stepless speed changing mechanism 4, whereby an inertia correction amount due to the changes in the engine rotational speed Ne is calculated. Finally, at step S22-5, the rolling resistance, the air resistance, the acceleration resistance, and the inertia correction amount are added to thereby obtain the running resistance.

Here, the propelling force of the vehicle is equal to the wheel driving force, and the force to resist the propelling force is equal to the running resistance and the reversing force due to the road surface gradient (=vehicle weight×sin Rθ) and, therefore, the following formula applies wheel driving force=running resistance+vehicle weight×sin Rθ

Figure 9:
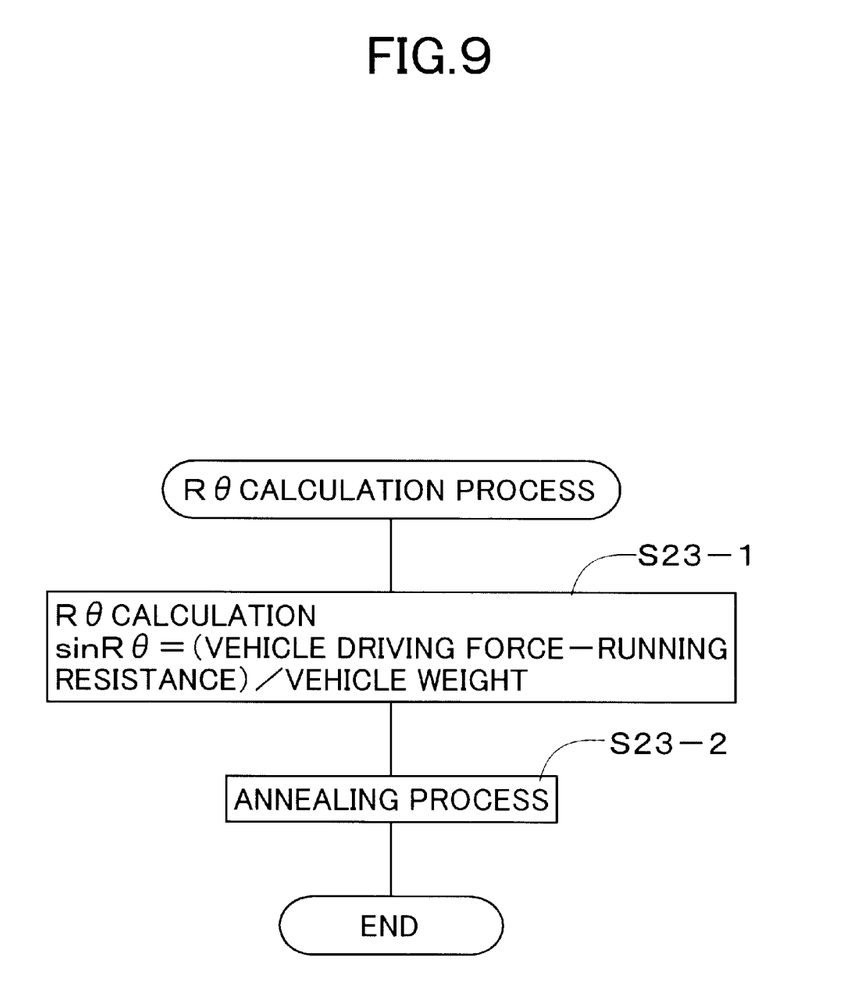
FIG. 9 is a flow chart showing the details of that process of calculating a road surface gradient which is included in the process of setting the second flag F2.

Therefore, in the process of computing the road surface gradient Rθ, the following steps are taken as shown in FIG. 9. Namely, at step S23-1, the running resistance is deducted from the wheel driving force, and this deducted value is divided by the vehicle weight, whereby the road surface gradient Rθ is calculated as its sinusoidal value sin Rθ. Then, at step S23-2, a process for annealing the road surface gradient Re is performed through weighted average.

At the time of speed reduction which leads to the standstill of the vehicle, the operating state of the lock-up clutch 2a is switched from the direct-coupled state to the slipping state or to the inoperative state. The wheel driving force is calculated by that fluid transmission torque of the torque converter 2 which is calculated by the torque ratio κ and the input shaft torque coefficient τ to be searched from the speed ratio etr of the torque converter 2, and the engine rotational speed Ne. Unlike the output torque of the engine 1, this fluid transmission torque is hardly subject to the influence of the aging deterioration or the like. Therefore, at the time of speed reduction leading to the standstill of the vehicle, there can be correctly calculated the road surface gradient Rθ. The control of the forward running clutch 34 depending on the road surface gradient Rθ in the creeping mode can be adequately performed.

In the above-described embodiment, the program has been arranged to proceed to step S9 when the road surface gradient Rθ is above the predetermined upgrade YRθ to thereby set the clutch pressure to the intermediate creeping pressure. However, it may also be arranged that the program proceeds to step S5 when Rθ≧YRθ to thereby set the clutch pressure to the strong creeping pressure.

As can be seen from the above explanations, according to the road surface gradient detecting apparatus of the present invention, the road surface gradient can be accurately calculated. Especially, as compared with the one which uses the engine output torque, the calculating accuracy of the road surface gradient in the region of low engine rotation is improved. The road surface detection can thus be made appropriately when the control of a starting friction engaging element like the above-described forward running clutch 34 is carried out depending on the road surface gradient at the time of vehicle standstill, resulting in an improved reliability.

It is readily apparent that the above-described road surface gradient detecting apparatus meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A road surface gradient detecting apparatus for use in a vehicle in which wheels are driven by an engine through a power transmission device having interposed therein a torque converter containing therein a lock-up clutch, said road surface gradient being calculated by a wheel driving force and a vehicle acceleration, said apparatus comprising:

a first driving force calculating means for calculating, while the lock-up clutch is not in operation, the wheel driving force based on that fluid transmission torque of the torque converter which is obtained by a speed ratio of the torque converter and an input rotational speed of the torque converter;

a second driving force calculating means for calculating, while the lock-up clutch (2a) is in operation in a direct-coupled state, the wheel driving force based on an engine output torque; and a third driving force calculating means for calculating, while the lock-up clutch is in operation in a slipping state, the wheel driving force based on a total torque of: that fluid transmission torque of the torque converter which is obtained by the speed ratio of the torque converter and the input rotational speed of the torque converter;

and that transmission torque of the lock-up clutch which is calculated by an engaging force of the lock-up clutch, whereby the road surface gradient is calculated by the wheel driving force which is calculated by the driving force calculating means corresponding to the state of the lock-up clutch.

2. The road surface gradient detecting apparatus for use in a vehicle according to claim 1, wherein said wheel driving force is corrected by deduction depending on a braking force, said braking force being calculated based on the hydraulic pressure of a brake during a depression of a brake pedal.

* * * * *